(12) United States Patent
Shin et al.

(10) Patent No.: US 11,503,462 B2
(45) Date of Patent: Nov. 15, 2022

(54) ELECTRONIC DEVICE AND DIGITAL KEY PROVISIONING METHOD OF ELECTRONIC DEVICE

(71) Applicant: Samsung Electronics Co., Ltd., Suwon-si (KR)

(72) Inventors: Inyoung Shin, Suwon-si (KR); Sooyeon Jung, Suwon-si (KR); Jonghyo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/970,152

(22) PCT Filed: Feb. 28, 2019

(86) PCT No.: PCT/KR2019/002425
§ 371 (c)(1),
(2) Date: Aug. 14, 2020

(87) PCT Pub. No.: WO2019/172579
PCT Pub. Date: Sep. 12, 2019

(65) Prior Publication Data
US 2021/0112407 A1    Apr. 15, 2021

(30) Foreign Application Priority Data

Mar. 5, 2018 (KR) .................. 10-2018-0026051
Apr. 4, 2018 (KR) .................. 10-2018-0039344

(51) Int. Cl.
*H04W 12/041* (2021.01)
*H04W 12/069* (2021.01)
(Continued)

(52) U.S. Cl.
CPC .......... *H04W 12/041* (2021.01); *G06F 21/44* (2013.01); *H04L 63/0442* (2013.01);
(Continued)

(58) Field of Classification Search
CPC . H04W 12/041; H04W 12/069; H04W 12/08; H04W 12/50; H04W 12/033;
(Continued)

(56) References Cited

U.S. PATENT DOCUMENTS 8,494,502 B2     7/2013   Abel et al.
8,739,266 B2 *   5/2014   Buer .................. G06Q 20/3674
                                                    713/172
(Continued)

FOREIGN PATENT DOCUMENTS

KR        10-0463643 B1      12/2004
KR     10-2012-0117910 A     10/2012
(Continued)

OTHER PUBLICATIONS

Extended European search dated Oct. 23, 2020, issued in European Application No. 19763567.5.
(Continued)

*Primary Examiner* — Trong H Nguyen
*Assistant Examiner* — Hamid Talaminaei
(74) *Attorney, Agent, or Firm* — Jefferson IP Law, LLP

(57) ABSTRACT

Disclosed are an electronic device and a method of performing digital key provisioning of an electronic device. The electronic device according to an embodiment includes a communication unit, a memory that stores programs and data for performing digital key provisioning, and a processor configured to, by executing the programs stored in the memory, perform device authentication on a target device by performing short-range communication with the target device, identify a digital key service access right of the target device through a server by obtaining user information, and control generation and storing of a digital key in response to a digital key generation request from the target device.

17 Claims, 6 Drawing Sheets

(51) Int. Cl.
| | |
|---|---|
| *H04W 12/50* | (2021.01) |
| *H04W 12/06* | (2021.01) |
| *H04W 12/033* | (2021.01) |
| *H04L 9/40* | (2022.01) |
| *H04L 9/08* | (2006.01) |
| *H04L 9/32* | (2006.01) |
| *H04W 4/40* | (2018.01) |
| *G06F 21/44* | (2013.01) |
| *H04W 12/08* | (2021.01) |
| *G06F 21/33* | (2013.01) |
| *G06F 21/35* | (2013.01) |
| *G06F 21/62* | (2013.01) |
| *G07C 9/00* | (2020.01) |

(52) U.S. Cl.
CPC .......... *H04L 63/0869* (2013.01); *H04W 4/40* (2018.02); *H04W 12/069* (2021.01); *H04W 12/08* (2013.01)

(58) Field of Classification Search
CPC ......... H04W 12/06; H04W 4/40; H04W 4/80; G06F 21/44; G06F 21/6218; G06F 21/35; G06F 21/335; G06F 21/62; G06F 21/33; G06F 21/445; G06F 2221/2141; H04L 63/0442; H04L 63/0869; H04L 63/0823; H04L 9/3213; H04L 9/0825; H04L 9/3234; H04L 2209/84; H04L 2209/805; G07C 9/00309; G07C 9/00571
See application file for complete search history.

(56) References Cited

U.S. PATENT DOCUMENTS

| | | | |
|---|---|---|---|
| 2013/0259232 | A1 | 10/2013 | Petel |
| 2014/0344153 | A1* | 11/2014 | Raj ...................... G06Q 20/385 705/44 |
| 2015/0071437 | A1* | 3/2015 | Chastain ............... H04L 9/3234 380/249 |
| 2015/0244711 | A1* | 8/2015 | Venkataraman ........ H04L 9/321 713/168 |
| 2016/0203661 | A1 | 7/2016 | Pudar et al. |
| 2016/0239686 | A1* | 8/2016 | Kwon ..................... G06F 21/602 |
| 2017/0236343 | A1* | 8/2017 | Leboeuf .................... H04L 9/30 340/5.61 |
| 2017/0346851 | A1 | 11/2017 | Drake |
| 2018/0123804 | A1* | 5/2018 | Smith ................... H04L 9/0825 |
| 2019/0122191 | A1* | 4/2019 | Filipiak ............... G06Q 20/3829 |
| 2020/0052905 | A1* | 2/2020 | Mathias ................ H04L 9/3247 |
| 2020/0287907 | A1 | 9/2020 | Park et al. |

FOREIGN PATENT DOCUMENTS

| | | |
|---|---|---|
| KR | 10-2016-0122061 A | 10/2016 |
| KR | 10-2017-0071094 A | 6/2017 |
| KR | 10-1757214 B1 | 7/2017 |
| KR | 10-2017-0100173 A | 9/2017 |

OTHER PUBLICATIONS

International Search Report and Written Opinion dated Jun. 24, 2019, issued in International Patent Application No. PCT/KR2019/002425.

Korean Office Action with English translation dated Jun. 8, 2022; Korean Appln No. 10-2018-0039344.

* cited by examiner

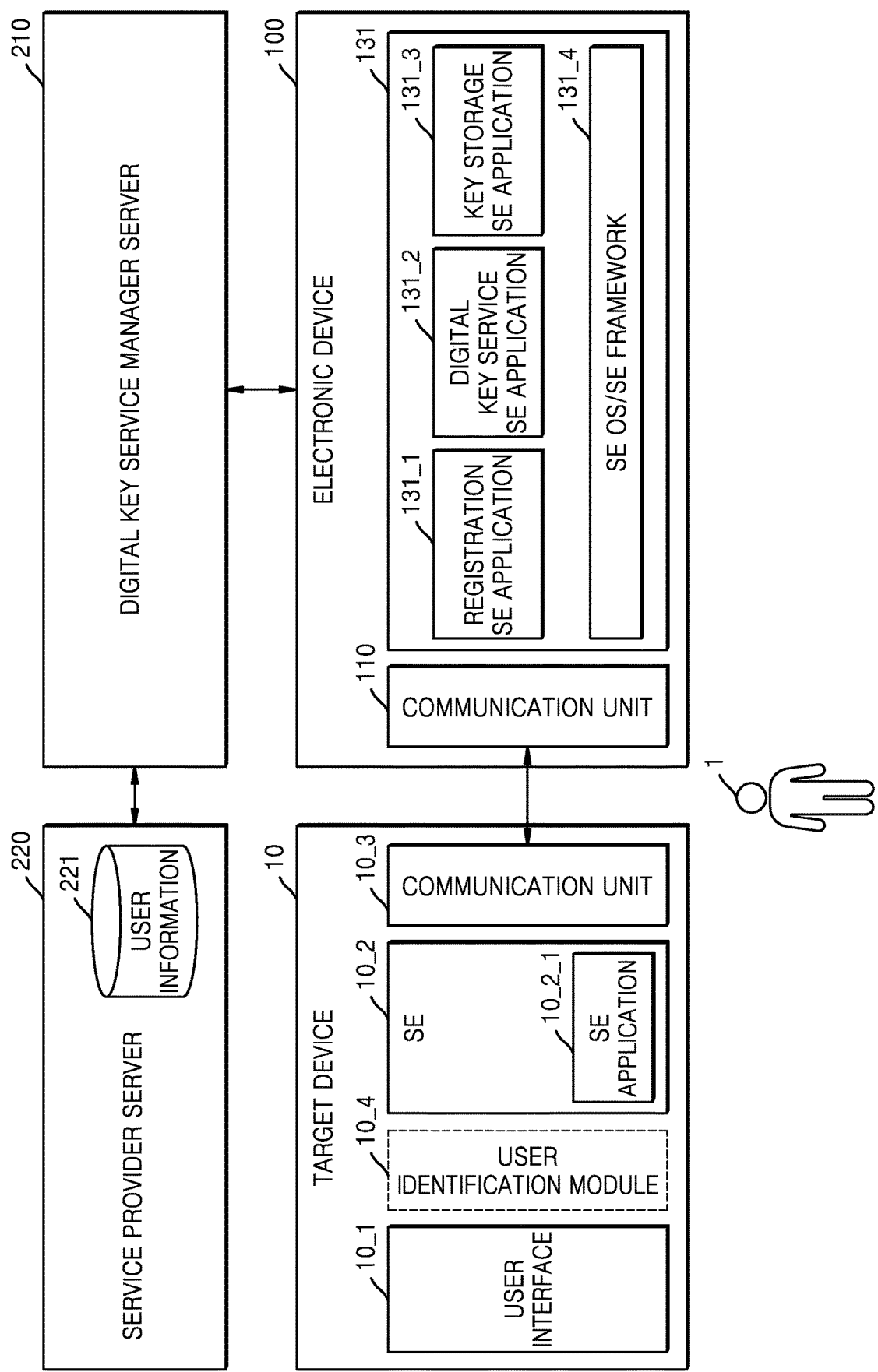

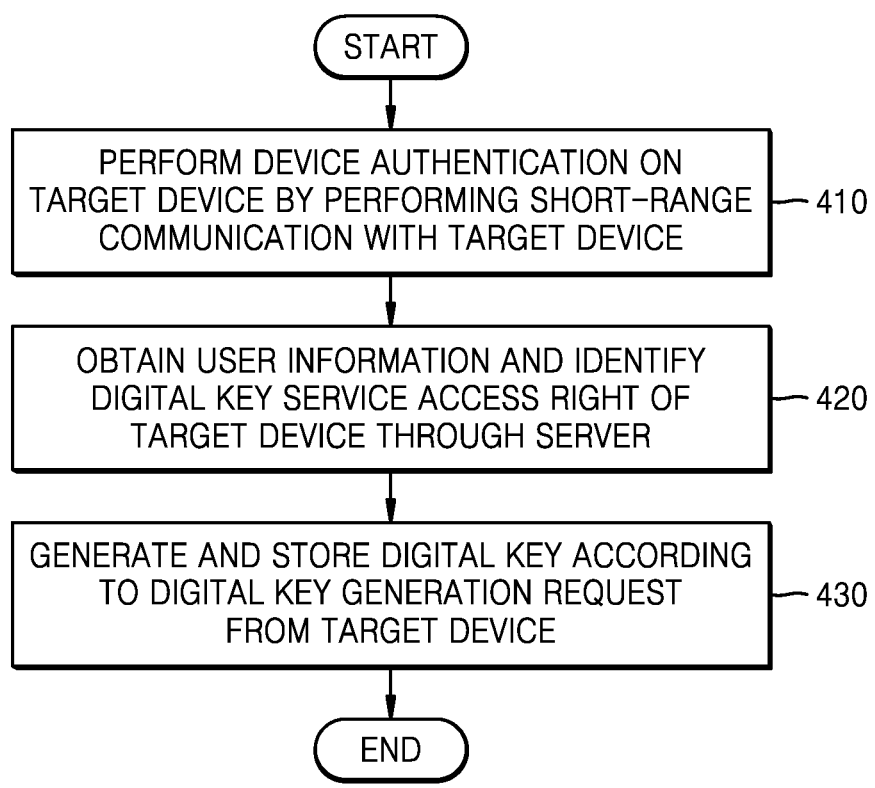

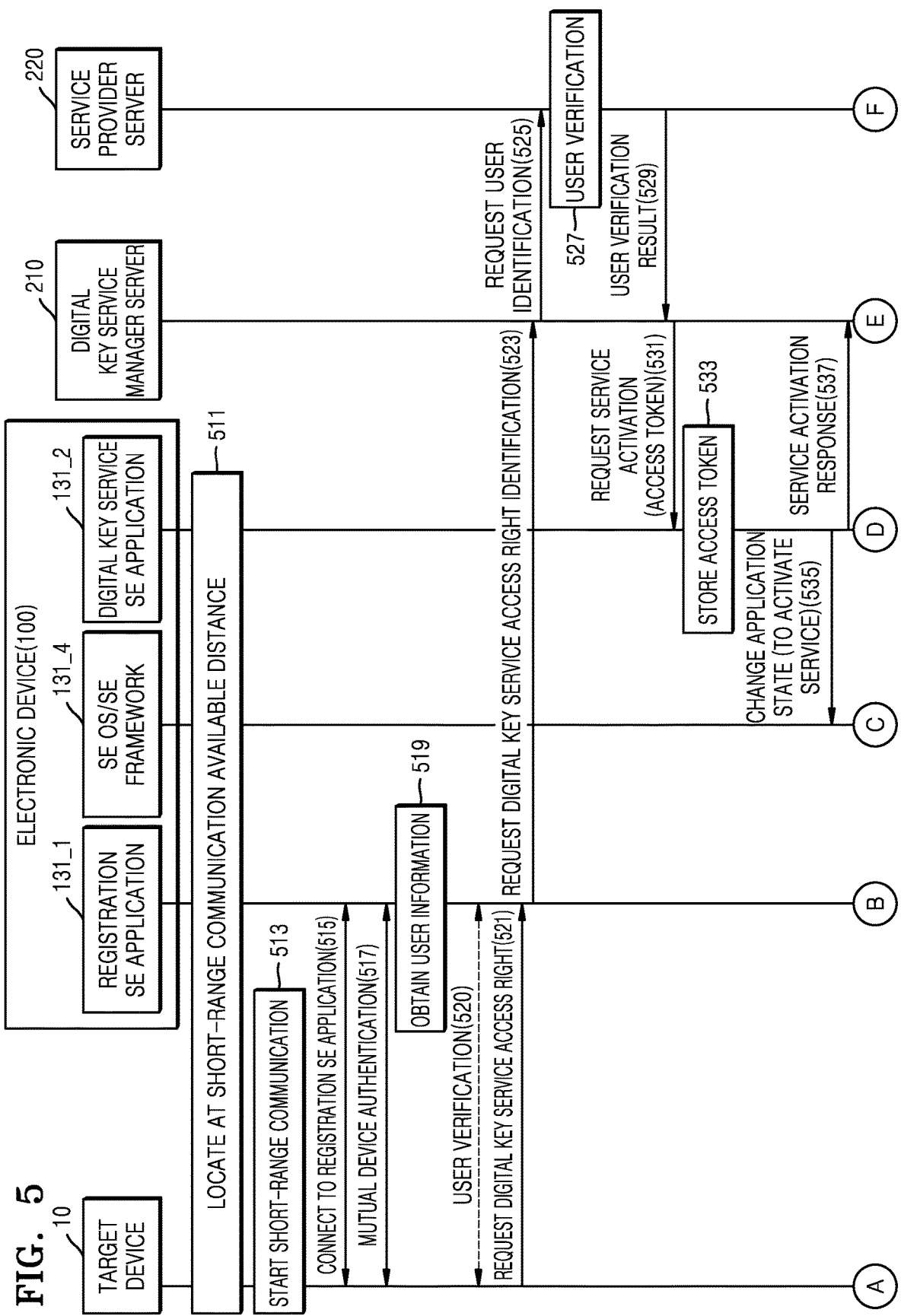

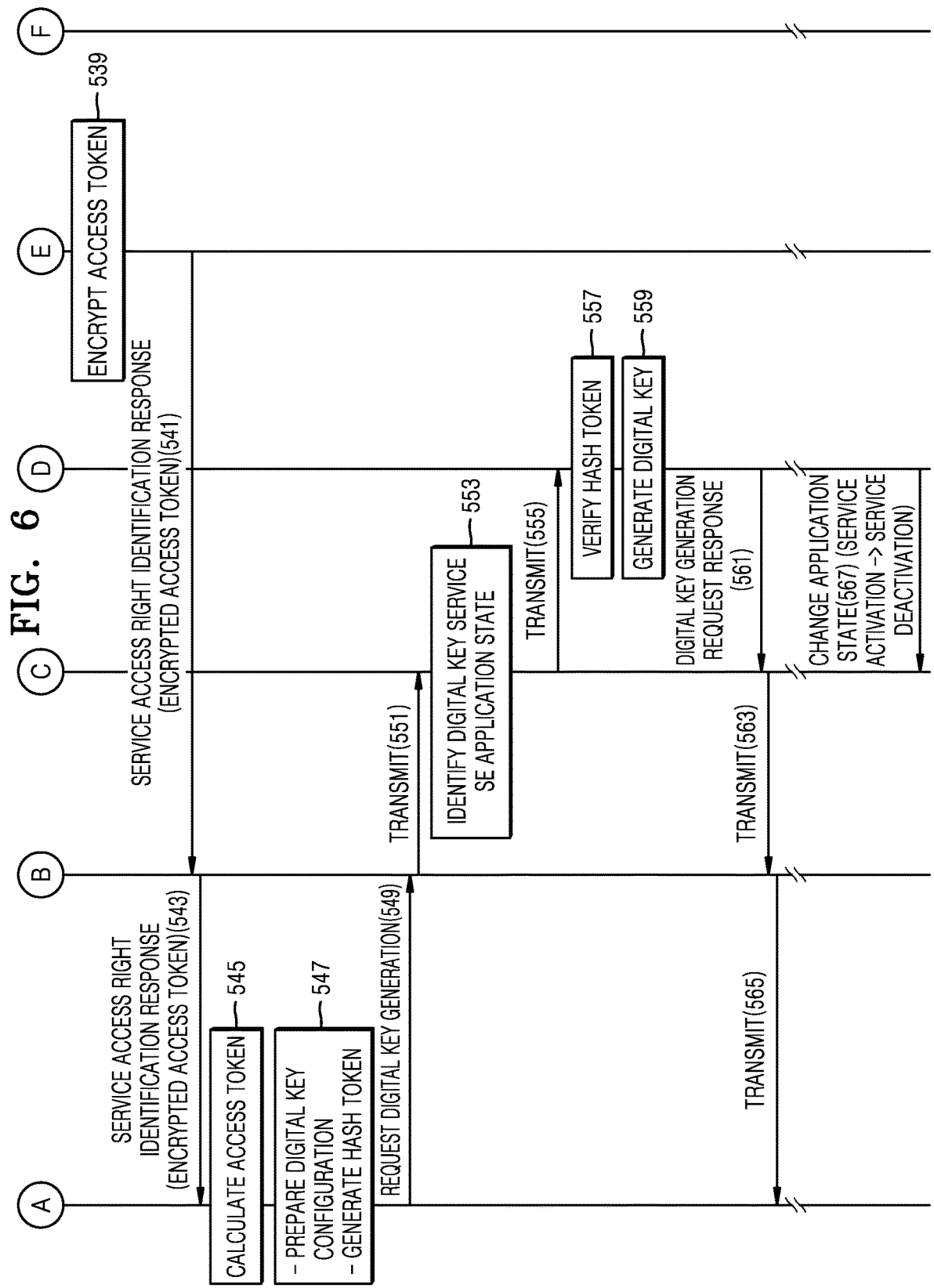

ELECTRONIC DEVICE AND DIGITAL KEY PROVISIONING METHOD OF ELECTRONIC DEVICE

TECHNICAL FIELD

The disclosure relates to an electronic device and a method of performing digital key provisioning of an electronic device.

BACKGROUND ART

With the distribution of personalized electronic devices such as smartphones and tablet PCs, technologies for performing security and authentication using digital keys have been developed. As one solution of the digital key technology, a technology in which a digital key is integrated into a mobile device, for example, a smartphone, by using a wireless communication technology such as near field communication (NFC) has been developed. In other words, a digitized virtual key, that is, a digital key, is inserted in a mobile device, and as a user of the mobile device uses the digital key, the user does not need to carry a physical separate key for door opening/closing, control, and access.

For example, in the automobile industry field, various types of digital key-related technologies have been developed, and the developed digital key-related technologies have provided convenience to drivers. In detail, in the automobile industry, key-related technologies have been developed from mechanical keys to remote keys, from remote keys to smart keys, and from smart keys to digital keys. Accordingly, in the future, the concept of owning a physical car key will be slim.

As such, while the use of digital keys may bring great improvements in user convenience and industrial effects, security concerns are also being raised. In other words, as described above, as the digital key basically needs to be combined with an electronic device, the digital key may be exposed to malicious use such as hacking of the electronic device. Accordingly, a method of providing and using a reliable digital key is needed.

DESCRIPTION OF EMBODIMENTS

Technical Problem

The disclosure provides an electronic device and a method of performing digital key provisioning of an electronic device.

Solution to Problem

An electronic device according to an embodiment includes a communication unit, a memory storing programs and data for performing digital key provisioning, and a processor configured to, by executing the programs stored in the memory, perform device authentication on a target device by performing a short-range communication with the target device, identify a digital key service access right of the target device through a server by obtaining user information, and control generation and storing of a digital key in response to a digital key generation request from the target device.

A method of performing digital key provisioning of an electronic device according to another embodiment includes performing device authentication on a target device by performing a short-range communication with the target device, identifying a digital key service access right of the target device by obtaining user information through a server, and generating and storing a digital key according to a digital key generation request from the target device.

A computer program product according to another embodiment includes a recording medium having a program stored therein to implement a method of performing digital key provisioning of an electronic device.

Advantageous Effects of Disclosure

According to an embodiment, a highly reliable digital key may be provided.

BRIEF DESCRIPTION OF DRAWINGS

FIG. 3 illustrates a method of operating an electronic device, according to an embodiment.

FIG. 4 is a flowchart of a method of performing digital key provisioning of an electronic device, according to an embodiment.

FIGS. 5 and 6 are flowcharts of a method of performing digital key provisioning, according to an embodiment.

BEST MODE

Figure 1:
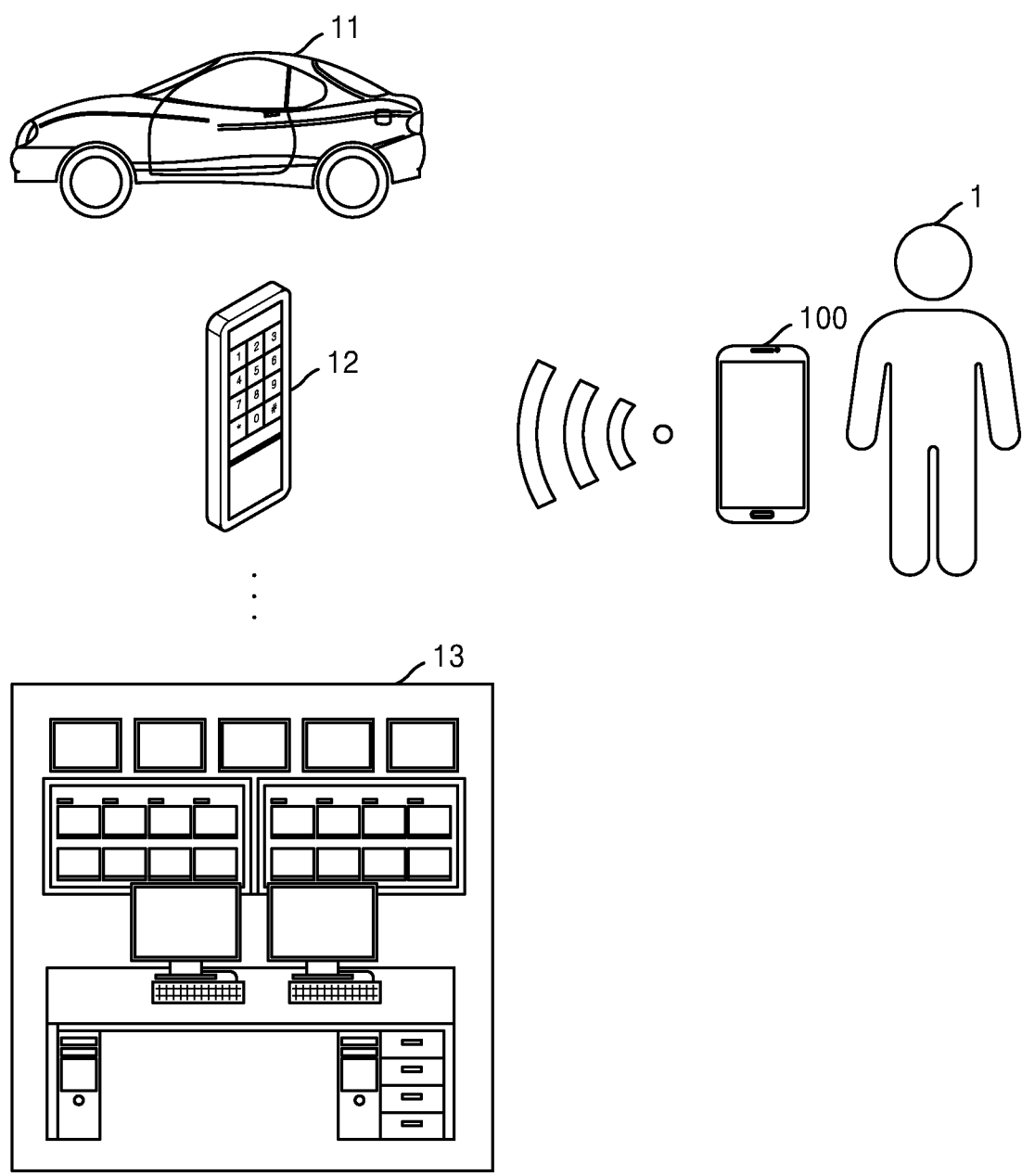
FIG. 1 illustrates a system employing the disclosure.

An electronic device according to an embodiment includes a communication unit, a memory that stores programs and data for performing digital key provisioning, and a processor configured to, by executing the programs stored in the memory, perform device authentication on a target device by performing a short-range communication with the target device, identify a digital key service access right of the target device through a server by obtaining user information, and control generation and storing of a digital key in response to a digital key generation request from the target device.

In an embodiment, the processor may be further configured to, when the user information is obtained, control such that the user information is received from the target device.

In an embodiment, the electronic device may further include an input unit, wherein the processor is further configured to, when the user information is obtained, control such that the user information is received through the input unit.

In an embodiment, the processor may be further configured to control such that user verification is performed on the target device and by using the user information.

In an embodiment, the processor may be further configured to, when device authentication is performed on the target device by performing the short-range communication with the target device, control such that the mutual device authentication is performed with the target device, and authentication certificate information are exchanged with the target device.

In an embodiment, the processor may be further configured to, when the user information is obtained and the digital key service access right of the target device is identified through the server, control such that a digital key service access right request including the information about identification of the target device is received, a digital key service access right identification request including at least one of the user information, the information about identification of the target device, information about a certificate of authentication of the target device, or information about identification of a secure element (SE) of the electronic device is transmitted to the server.

In an embodiment, the processor may be further configured to, when the user information is obtained and the digital key service access right of the target device is identified through the server, control such that, when the electronic device is not in a network connected state, the information about identification of the target device and the information about a certificate of authentication of the target device are stored, and then after the electronic device is reconnected to the network, the stored information is transmitted to the server.

In an embodiment, the processor may be further configured to, when the user information is obtained and the digital key service access right of the target device is identified through the server, and when a digital key service access by the target device is approved, control such that an access token for identification of an access right of the target device is received from the server and stored.

In an embodiment, the access token may include at least one of a random value generated by the server or authentication certificate information signed with a private key of the server.

In an embodiment, the processor may be further configured to, when the user information is obtained and the digital key service access right of the target device is identified through the server, and when a digital key service access by the target device is approved, control such that an encrypted access token is received from the server by using a public key of the target device and transmitted to the target device.

In an embodiment, the processor may be further configured to, when a digital key is generated and stored according to a digital key generation request from the target device, control such as a hashed token including at least one of decryption information of the encrypted access token or digital key configuration information is received from the target device, the hashed token is verified by using the stored access token, and a digital key is generated according to a verification result.

A method of performing digital key provisioning of an electronic device according to another embodiment includes performing device authentication on a target device by performing a short-range communication with the target device, identifying a digital key service access right of the target device by obtaining user information through a server, and generating and storing a digital key according to a digital key generation request from the target device.

In an embodiment, the identifying of the digital key service access right of the target device by obtaining the user information through the server may include receiving the user information from the target device.

In an embodiment, the identifying of the digital key service access right of the target device by obtaining the user information through the server may include receiving the user information through an input unit.

In an embodiment, the identifying of the digital key service access right of the target device by obtaining user information through the server may include performing user verification with the target device by using the user information.

In an embodiment, the performing of device authentication on the target device by performing a short-range communication with the target device may include performing mutual device authentication with the target device, and exchanging authentication certificate information with the target device.

In an embodiment, the identifying of the digital key service access right of the target device by obtaining the user information through the server may include receiving a digital key service access right request including the identification information of the target device, and transmitting to the server a digital key service access right identification request including at least one of the user information, identification information of the target device, the information about a certificate of authentication of the target device, or identification information of the SE of the electronic device.

In an embodiment, the identifying of the digital key service access right of the target device by obtaining the user information through the server may include, when the electronic device is not in a network connected state, storing identification information of the target device and the information about a certificate of authentication of the target device, and then after the electronic device is reconnected to the network, transmitting the stored information to the server.

In an embodiment, the identifying of the digital key service access right of the target device by obtaining the user information through the server may include, the when a digital key service access by the target device is approved, receiving from the server an access token for identification of the access right of the target device and storing the access token.

In an embodiment, the access token may include at least one of a random value generated by the server or the authentication certificate information signed with a private key of the server.

In an embodiment, the identifying of the digital key service access right of the target device by obtaining the user information through the server may include, when the digital key service access by the target device is approved, receiving from the server an encrypted access token by using a public key of the target device, and transmitting the encrypted access token to the target device.

In an embodiment, the generating and storing of the digital key according to the digital key generation request from the target device may include receiving from the target device a hashed token including at least one of information about decryption of the encrypted access token or digital key configuration information, verifying the hashed token by using the stored access token, and generating a digital key according to a verification result.

A computer program product according to another embodiment includes a recording medium having a program stored therein to implement a method of performing digital key provisioning of an electronic device.

MODE OF DISCLOSURE

Hereinafter, embodiments of the disclosure will be described in detail with reference to the accompanying drawings so that those of skill in the art to which the disclosure belongs can easily implement them. The disclosure may, however, be embodied in many different forms and should not be construed as being limited to the embodiments set forth herein. Furthermore, a part that is not related to a description is omitted to clearly describe the disclosure, and like reference numerals in the drawings denote like elements, throughout the specification.

The disclosure may be described in terms of functional block components and various processing steps. Such functional blocks may be realized by any number of hardware and/or software components configured to perform the specified functions. For example, the functional blocks of the disclosure may be implemented by one or more microprocessors or circuit components for a certain function. Furthermore, the functional blocks of the disclosure may be implemented by, for example, various programming or scripting languages. The functional blocks may be implemented in algorithms that are executed on one or more processors. Furthermore, the disclosure could employ any number of conventional techniques for electronics configuration, signal processing and/or control, data processing and the like.

Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

Furthermore, terms such as " . . . portion", " . . . unit", and " . . . module" stated in the specification may signify a unit to process at least one function or operation and the unit may be embodied by hardware, software, or a combination of hardware and software. The " . . . portion", " . . . unit", and " . . . module" may be stored in an addressed storing medium and may be implemented by a program that is executable by a processor.

For example, the " . . . portion", " . . . unit", and " . . . module" may be implemented by constituent elements such as software constituent elements, object-oriented software constituent elements, class constituent elements, and task constituent elements, and by processes, functions, properties, procedures, subroutines, segments of program codes, drivers, firmware, microcodes, circuits, data, databases, data structures, tables, arrays and variables.

FIG. 1 illustrates a system employing the disclosure.

Referring to FIG. 1, an electronic device 100, a user 1 of the electronic device 100, and target devices 11, 12, . . . , 13 for performing control and access by using a digital key mounted in the electronic device 100 are provided.

The electronic device 100 may include a personalized mobile device, but the disclosure is not limited thereto and the electronic device 100 may include various types of electronic devices. For example, the electronic device 100 may include smartphones, tablet PCs, PCs, cameras, and wearable devices. In an embodiment, the electronic device 100 may generate and store a digital key for controlling and accessing the target devices 11, 12, . . . , 13.

The target devices 11, 12, . . . , 13 may perform an operation for generating a digital key by interacting with the electronic device 100, and may be controlled and accessed by using the digital key that is generated through the above process and stored in the electronic device 100. In an embodiment, the target devices 11, 12, . . . , 13 may perform an operation for generating a digital key through a short-range communication with the electronic device 100 located within a certain distance.

For example, when the target device is a car 11, the user may generate a digital key by interacting with the car 11 through the electronic device 100 and store the generated digital key in the electronic device 100. The user may control various operations of the car 11 by using the digital key stored in the electronic device 100. For example, the user may open/close doors, start the engine, or control various electronic devices mounted in the car, by using the digital key stored in the electronic device 100. Furthermore, an operation related to autonomous driving such as automatic parking system. Furthermore, when a target device is a door lock 12, a locking device may be opened/closed through the digital key stored in the electronic device 100, and when the target device is a control system 13, the user 1 is authenticated through the digital key, and a right of a different level may be given according to an authenticated user.

The embodiments illustrated in FIG. 1 are merely exemplary, and the scope of the disclosure is not limited by the contents illustrated in FIG. 1. For example, various target devices may exist in addition to the target devices 11, 12, . . . , 13 illustrated in FIG. 1.

Figure 2:
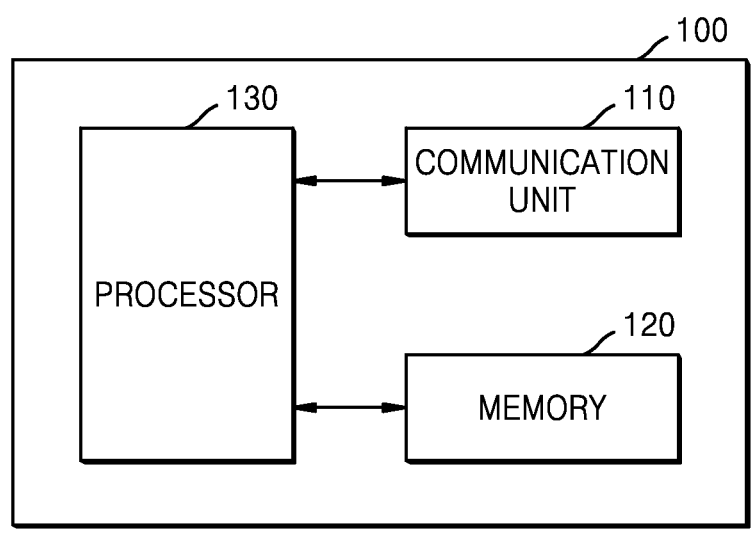
FIG. 2 illustrates a configuration of an electronic device according to an embodiment.

FIG. 2 illustrates a configuration of an electronic device according to an embodiment.

Referring to FIG. 2, the electronic device 100 may include a communication unit 110, a memory 120, and a processor 130.

The communication unit 110 may perform wired or wireless communication with other device or network. To this end, the communication unit 110 may include a communication module supporting at least one of various wired or wireless communication methods. For example, the communication module may be in the form of a chipset or may be sticker/barcode, e.g. a sticker including an NFC tag, including information needed for communication.

The wireless communication may include at least one of, for example, cellular communication, wireless fidelity (Wi-Fi), Wi-Fi direct, Bluetooth, ultra wide band (UWB), or near field communication (NFC). The wired communication may include at least one of, for example, USB or high definition multimedia interface (HDMI).

In an embodiment, the communication unit 110 may include a communication module for short-range communication. For example, the communication unit 110 may include a communication module for performing various short-range communication such as infrared communication or magnetic secure transmission (MST) communication, in addition to the above-described Wi-Fi, Wi-Fi Direct, Bluetooth, and NFC.

Various types of data, for example, files or programs such as applications may be installed and stored in the memory 120. The processor 130 accesses and uses the data stored in the memory 120 or stores new data in the memory 120. In an embodiment, programs and data for performing digital key provisioning may be installed and stored in the memory 120. In an embodiment, the memory 120 may include a secure element (SE) that can be accessed by an authenticated application only. The SE may be configured to be physically isolated from other hardware configurations. In an embodiment, programs and data for performing digital key provisioning may be installed and stored in the SE. In an embodiment, the SE may include an embedded SE (hereinafter, eSE), a universal integrated circuit card (hereinafter, UICC), a secure digital card (hereinafter, SD Card), etc.

The processor 130 may control the overall operation of the electronic device 100 and may include at least one processor such as a CPU or a GPU. The processor 130 may control other elements included in the electronic device 100 to perform digital key provisioning. For example, the processor 130 may execute the program stored in the memory 120, read the file stored in the memory 120, or store a new file in the memory 120. In an embodiment, the memory 120 may be a SE.

In an embodiment, the processor 130, by executing the program stored in the memory 120, may control other elements to perform a short-range communication with a target device, perform a device authentication with respect to the target device, obtain user information to identify a digital key service access right of the target device through a server, and generate and store a digital key a according to a digital key generation request from the target device. The processor 130 may execute, to perform the digital key provisioning, SE including a REGISTRATION SE application, a digital key SERVICE SE application, a key storage-SE application secure element. Furthermore, the processor 130 may execute a SE framework or a SE operation system (OS). The above features are described below in detail in the description related to FIG. 3.

In an embodiment, the processor 130, when obtaining user information, may control the communication unit 110 to receive user information from the target device. According to an embodiment, the processor 130 receives an input of the user information from the target device, not directly from the user, so that a risk of seizure of the user information through a man-in-the-middle attack in an on-line user verification process may be reduced.

The processor 130, when performing device authentication on a target device by performing a short-range communication with the target device, may perform a mutual device authentication with the target device and may control to exchange information during the authentication. In this state, the processor 130 may perform a short-range communication with the target device by controlling the short-range communication module of the electronic device 100. The short-range communication may include an NFC communication. However, the disclosure is not limited thereto, and various short-range communication methods may be employed. According to the disclosure, when the electronic device 100 ad the target device are located close to each other enough to perform a short-range communication, by mutually performing device authentication, during the mutual device authentication between the electronic device 100 and the target device, security risk according to intrusion of an external device may be reduced.

Furthermore, the processor 130, when obtaining the user information to identify a digital key service access right of the target device through the server, may control other elements to receive a digital key service access right request including information about identification of a target device, for example, a VIN number when the target device is a car. Furthermore, the processor 130 may control, on the basis of the received digital key service access right request, other elements to transmit a digital key service access right identification request including the digital key service access right request including at least one of user information, information about identification of a target device, information about a certificate of authentication of a target device, or information about identification of the SE of an electronic device. In this state, the digital key service access right identification request transmitted to the server may be generated from the target device on the basis of the received digital key service access right request.

In an embodiment, when the electronic device 100 is not connected to a network, the processor 130 may store information to be transmitted to the server in the memory 120, and after the electronic device 100 is connected to the network, may transmit the stored information to the server. For example, when the electronic device 100 is not in a network connected state when transmitting the digital key service access right identification request, the processor 130 may store information about a certificate of authentication of a target device or information about identification of a target device in the electronic device, and then after the electronic device 100 is reconnected to the network, may identify a digital key service access right of the target device by transmitting the information to the server. In other words, the processor 130 may verify the digital key service access right of the target device, in real time or later, according to the network state of the electronic device 100. Furthermore, when the electronic device 100 stores information to verify a certificate of authentication of a target device 10, the processor 130 may perform a local verification in the electronic device 100, not through the server. For example, when the electronic device 100 stores a higher certificate of authentication to verify the certificate of authentication of the target device 10, the processor 130 may perform verification on the certificate of authentication of the target device 10 by using the higher certificate of authentication.

In an embodiment, when identifying a digital key service access right of the target device through the server by obtaining the user information, the processor 130 may control other elements to receive an access token for identification of an access right of the target device from the server and store the access token when the target device is approved to access a digital key service. The access token may include at least one of a random value generated by the server or authentication certificate information signed with a private key of the server. The access token may be received in response to the digital key service access right identification request transmitted to the server.

In an embodiment, when identifying the digital key service access right of the target device through the server by obtaining the user information, the processor 130 may control other elements to receive an access token encrypted by using a public key of the target device from the server and transmit the access token to the target device when the target device is approved to access the digital key service. This is a process of informing the target device that a digital key service access has been approved.

The processor 130, when generating and storing a digital key according to a digital key generation request from the target device, may receive from the target device a hashed token including at least one of information about decryption of the encrypted access token or digital key configuration information. The processor 130 may control other elements to verify the hashed token by using the stored access token and generate a digital key according to a verification result.

According to an embodiment, in a digital key generation process, a security risk according to an external attack may be reduced, and thus a highly reliable digital key may be provided.

However, the configuration of the electronic device 100 is not limited to the configurations illustrated in FIG. 2, and the electronic device 100 may include various other elements in addition to the communication unit 110, the memory 120, and the processor 130. For example, as described above, the electronic device 100 may further include an input unit (not shown).

The input unit may receive a user input for controlling the electronic device 100. The input unit may include a user input device including a touch panel receiving a user's touch, a button to receive a user's push operation, a wheel to receive a user's rotation operation, a key board, and a dome switch, but the disclosure is not limited thereto. In an embodiment, the processor 130 may receive user information by controlling the input unit. Furthermore, the processor 130 may user previously stored user information. According to an embodiment, when a target device is not provided with an input unit for inputting user information or even when the target device is provided with an input unit, the user information may be input through the input unit of the electronic device 100 for user convenience.

In an embodiment, when the user information is received through the input unit, the processor 130 may perform user verification with the target device by using the user information. Next, the processor 130 may identify the digital key service access right of the target device through the server. In detail, the processor 130 may transmit a certificate of authentication of the target device to the server on the basis of a user verification result and identify the digital key service access right of the target device. According to an embodiment, when the user information is received through the input unit, a user is authenticated through the target device, and the digital key service access right of the target device may be identified through the server.

FIG. 3 illustrates a method of operating an electronic device according to an embodiment.

Referring to FIG. 3, a service provider server 220, a digital key service manager server 210, the electronic device 100, and the target device 10 are illustrated.

The service provider server 220 is a server of a service provider providing a digital key service to the user 1. The service provider refers to a business operator who provides services related to, for example, cars, hotels, houses, or buildings, and is a business operator who provides a digital key service to the user 1 as an additional service with respect to a main service. For example, a car company sells cars, and hotel, house, or building companies provide services related to hotels, houses, or buildings. The service provider may provide a digital key service for access functions such as door opening/closing, engine start, or control.

The service provider server 220 may include user account information such as an ID or password of the user 1 or a user information database 221 such as sales products or service information. For example, when a car company sells a car, information about the ID or password of the user 1, the identification number of a sold car, or the use or non-use of a digital key service is stored.

The digital key service manager server 210 provides the electronic device 100 with technologies and services to securely issue a digital key. For example, when the user 1 purchases a car and tries to store a digital key in the electronic device 100, it is checked whether the user 1 is a valid user or the purchased car is a valid car, and a secure element (SE) 131 of the electronic device 100 may be given a right to generate and store a digital key, and an access to the SE 131 may be permitted.

Furthermore, in an embodiment, the digital key service manager server 210 may generate and manage SE applications 131_1, 131_2, and 131_3 executed in the SE 131.

The electronic device 100 may include the SE 131 or the communication unit 110. The SE 131 may include three SE applications, that is, a REGISTRATION SE application 131_1, a digital key SERVICE SE application 131_2, and a key storage-SE application 131_3, and a SE OS/framework 131_4.

The SE applications 131_1, 131_2, and 131_3 may be light application executed in the SE 131. The SE applications 131_1, 131_2, and 131_3 may be provided and installed by a digital key service manager, or may be previously mounted in the electronic device 100.

An entire procedure of issuing a digital key may be referred to as digital key provisioning and may be divided into three operations. The SE applications 131_1, 131_2, and 131_3 to be used may vary according to the operations. The above-described three steps may include a digital key service registration operation, a digital key service generation operation, and a digital key storage operation.

The registration SE application 131_1 is an SE application used for digital key service registration. For example, the communication unit 110 of the electronic device 100 and a communication unit 10_3 of the target device 10 may communicate with each other to perform a registration process for a digital service. In detail, the registration SE application 131_1 determines whether the electronic device 100 and the target device 10 are mutually approved devices. Furthermore, the registration SE application 131_1 may obtain user information. In detail, the registration SE application 131_1 may receive user information from the target device or from an input unit of the electronic device 100. Furthermore, previously stored user information may be used. A separate user application for receiving user information may be stored and installed in the electronic device 100. The registration SE application 131_1 may receive a request to identify a digital key service access right from the target device 10 and transmit the request to the digital key service manager server 210.

The digital key service SE application 131_2 may generate and transmit a digital key when the digital key service registration process has passed. The key storage SE application 131_3 may safely classify and store the generated digital key according to each target device 10.

The SE OS/framework 131_4 may control the overall operations of all applications executed in the SE 131. For example, the SE OS/framework 131_4 may manage the states of the SE applications 131_1, 131_2, and 131_3 and right information, and control and manage communications among the SE applications 131_1, 131_2, and 131_3.

The communication unit 110 of the electronic device 100 may include, for example, a short-range communication module used for transceiving signals between a vehicle and the electronic device 100. The communication unit 110 may include an NFC module to transceive signals between the target device 10 and the electronic device 100 through an NFC.

Although the communication unit 110 is assumed to be an NFC module in the above description, this is merely exemplary, and the disclosure is not limited thereto. Various short-range communication methods such as Bluetooth, Wi-Fi, infrared communication, or MST may be used.

The target device 10 is an entity corresponding to products and services that a service provider sells to the user 1. For example, the target device 10 may be a gate of a car, a hotel, a house, or a building. In detail, the target device 10 may be not only a vehicle door or a trunk gate, but also an access gate for engine start and vehicle control in a car.

Furthermore, the target device 10 may include a user interface 10_1, a SE 10_2, the communication unit 10_3, and user identification module 10_4.

The user interface 10_1 may receive a user input. For example, in a car, the user interface 10_1 may include a head unit and receive an input of the ID and password of the user 1. The user account information may be used for user verification by comparing with the user information database 221 of the service provider server 220. The SE 10_2 included in the target device 10 may include an SE application 10_2_1.

The SE 10_2 may be the SE of the target device 10 or a secure element similar thereto. The SE application 10_2_1 may be a light application executed in the SE 10_2 and may be a program unit of the SE application 10_2_1 or similar thereto. The SE application 10_2_1 may communicate with the SE applications 131_1, 131_2, and 131_3 of the electronic device 100. For example, during digital key issue, door opening/closing, and engine start, the SE application 10_2_1 of the target device 10 and the SE applications 131_1, 131_2, and 131_3 of the electronic device 100 may communicate with each other and perform a digital key provisioning procedure.

The communication unit 10_3 may include a communication module used to transmit and/or receive signals between the electronic device 100 and the digital key service manager server 210. Furthermore, the communication unit 10_3 may include a short-range communication module used to transmit and/or receive signals between the electronic device 100 and the target device 10. In an embodiment, the communication unit 10_3 may include an NFC module and may transceive signals between the target device 10 and the electronic device 100 through an NFC.

Although the communication unit 10_3 is described to include an NFC module in the above description, this is merely exemplary, and the disclosure is not limited thereto. Various short-range communication methods such as Bluetooth, Wi-Fi, infrared communication, or MST may be used.

The user identification module 10_4 may identify whether the use is a valid user by receiving user information from the electronic device 100. To this end, the user identification module 10_4 may use the user information database 221 stored in the service provider server 220. In detail, the user identification module 10_4 may access the service provider server 220 to access the user information database 221 or download information needed for user identification. As described above, the user information database 221 may include a user account and purchase information database. Furthermore, the information needed for user identification may be released by being mounted in the target device by a service provider, when a user purchases the target device.

In an embodiment, the information needed for user identification may include already registered user ID and password, an identification number of the target device 10, a user name, a one-time passcode (OTP), a PIN number, a voice command, biometric information, or GPS information. In this state, in order to reduce the risk of seizure of the user information through a man-in-the-middle attack, a function such as a trusted UI (TUI) or user biometric authentication may be added.

In an embodiment, the user identification module 10_4 may be used when the user information is received from the electronic device 100. Furthermore, the user identification module 10_4 may be omitted when the target device 10 receives an input of user information directly from a user.

The configurations of the respective device described above are not limited to the configurations illustrated in FIG. 3, some configurations may be omitted or other various configurations may be included therein.

FIG. 4 is a flowchart of a method of performing digital key provisioning of an electronic device according to an embodiment.

In FIG. 4, redundant contents to the descriptions presented above are briefly described.

In operation 410, the electronic device 100 performs a short-range communication with the target device and performs device authentication on the target device. In an embodiment, the electronic device 100 performs mutual device authentication with the target device and exchanges authentication certificate information therewith.

In operation 420, the electronic device 100 obtains user information and identifies a digital key service access right of the target device through the server. In an embodiment, the electronic device 100 may receive the user information from the target device. According to an embodiment, the processor 130 receives the user information not directly from a user, but from the target device, and thus may reduce a risk of seizure of the user information through a man-in-the-middle attack in an on-line user verification process.

In an embodiment, the electronic device 100 may receive the user information through an input unit. Furthermore, the electronic device 100 may perform verification of the target device and the user by using the user information. Next, the electronic device 100 may identify a digital key service access right of the target device through the server. In detail, the electronic device 100 may transmit a certificate of authentication of the target device to the server on the basis of a user verification result and may identify the digital key service access right of the target device. According to an embodiment, when there is no input unit capable of inputting user information to the target device or even when there is an input unit in the target device, for user convenience, the user information may be received through the input unit of the electronic device 100.

In an embodiment, the electronic device 100 may receive, from the target device, a digital key service access right request including information about identification of a target device. Furthermore, the electronic device 100 may transmit, to the server, a digital key service access right identification request including at least one of user information, information about identification of a target device, information about a certificate of authentication of a target device, or information about identification of the SE of the electronic device.

In an embodiment, when the electronic device 100 is not in a network connected state, information to be transmitted to the server is stored in the memory 120, and after the electronic device 100 is connected to a network, the stored information may be transmitted to the server. For example, the electronic device 100, when transmitting the digital key service access right identification request, if not in a network connected state, may store information about a certificate of authentication of a target device or information about identification of a target device, and when reconnected to the network, transmit the information to the server, thereby identifying the digital key service access right of the target device. In other words, according to the network state of the electronic device 100, the digital key service access right of the target device may be verified in real time or later.

Furthermore, when a digital key service access by the target device is approved, the electronic device 100, may received and store an access token for identifying an access right of the target device from the server. The access token may include at least one of a random value generated by the server or authentication certificate information signed with a private key of the server.

In an embodiment, when a digital key service access by the target device is approved, the electronic device 100 may receive an encrypted access token from the server by using a public key of the target device and transmit the encrypted access token to the target device.

In operation 430, the electronic device 100 may generate and store a digital key according to a digital key generation request from the target device. In an embodiment, the electronic device 100 may receive from the target device a hashed token including at least one of information about decryption of the encrypted access token or digital key configuration information, verify the hashed token by using the stored access token, and generate a digital key according to a verification result.

FIGS. 5 and 6 are flowcharts of a method of performing digital key provisioning according to an embodiment.

Referring to FIGS. 5 and 6, a method of performing digital key provisioning according to an embodiment is performed by the target device 10, the electronic device 100, the digital key service manager server 210, and the service provider server 220.

First, in operation 511, the target device 10 and the electronic device 100 are located at a distance where a short-range communication is possible. For example, the electronic device 100 may be located at an NFC reader of the target device 10. According to the disclosure, when the electronic device 100 and the target device 10 are located close to each other enough to perform a short-range communication, mutual device authentication is performed, and thus, during the mutual device authentication between the electronic device 100 and the target device 10, a security risk due to intrusion of an external device may be reduced.

Next, in operation 513, the electronic device 100 and the target device 10 start a short-range communication. For example, the electronic device 100 and the target device 10 may enter a pairing mode to perform pairing. In this state, the pairing mode may be performed as the electronic device 100 and/or the target device 10 receive an external input by a user.

In operation 515, the electronic device 100 and the target device 10 start a communication. In detail, the target device 10 may be connected to the registration SE application 131_1 of the electronic device 100 via a communication session, for example, an NFC session. Next, the electronic device 100 and the target device 10 may perform mutual device authentication, and furthermore, exchange a certificate of authentication. In this state, the mutual device authentication may include operations of verifying a certificate of authentication provided by an authentication object, by using, for example, a certificate of authentication based on a well-known public key infrastructure (PKI), and keeping a verified certificate of authentication.

In operation 519, the electronic device 100 obtains user information. In detail, the registration SE application 131_1 may receive the user information from the target device 10 or through the input unit of the electronic device 100. Furthermore, the previously stored user information may be used. Furthermore, when receiving the user information from the target device 10, the target device 10 may perform operations of encrypting information for user identification by using encryption information previously stored by a service provider in the target device 10, and signing by using a PKI certificate of authentication.

When the user information is received through the input unit of the electronic device 100 or the previously stored user information is used, user verification may be performed between the target device 10 and the electronic device 100 by optionally performing the operation 520.

In operation 520, the target device 10 may receive the information for user identification directly from the user through the user interface 10_1, for example, a device such as a touch screen, or may use the previously stored information. The target device 10 may compare the user information of the electronic device 100 and the information for user identification of the target device 10 by using the user identification module 10_4 capable of performing user verification. In this state, the information for user identification may include a user ID and password pre-registered by a service provider, an identification number of the target device 10, a user name, an OTP, a PIN number, a voice command, biometric information, or GPS information. In this state, in order to reduce the risk of seizure of the user information through a man-in-the-middle attack, a function such as a TUI or user biometric authentication may be added. The user identification module 10_4 may access the service provider server 220 to access the user information database 221, or download the information needed for user identification.

Next, in operation 521, the target device 10 requests a digital key service access right from the electronic device 100. In detail, the target device 10 may transmit a digital key service access right request to the registration SE application 131_1. In this state, the service access right request may include information for user identification and the identification number of the target device 10. According to an embodiment, the processor 130 receives the user information not directly from the user, but from the target device 10, thereby reducing the risk of seizure of the user information through a man-in-the-middle attack in the on-line user verification process.

In operation 523, the electronic device 100 transmits a service access right identification request to the digital key service manager server 210. In detail, the registration SE application 131_1 may transmit a service access right identification request to the digital key service manager server 210. In this state, the service access right identification request may include the information for user identification received from the target device 10, a certificate of authentication of the target device 10, the identification number of the target device 10, and the ID of the SE of the electronic device 100.

Next, in operation 525, the digital key service manager server 210 transmits a user identification request to the service provider server 220. In this state, the user identification request may include information for user identification and the certificate of authentication of the target device 10. Furthermore, the user identification request may include a verification request of the target device 10. In an embodiment, the digital key service manager server 210, when requesting the user identification, may additionally request identification of the target device 10 from the service provider server 220. In particular, when the user information is received and user verification is performed with the target device 10 in the electronic device 100 (when the operation 520 is performed), the verification of the target device 10 may be requested. In detail, the service provider server 220 may request identification of the certificate of authentication of the target device 10 from the service provider server 220, and when the digital key service manager server 210 has a higher certificate of authentication to verify the certificate of authentication of the target device 10, self-verification may be performed. Furthermore, when the electronic device 100 stores information for verification of the certificate of authentication of the target device 10, the electronic device 100 may perform local self-verification in the electronic device 100, not in the server. For example, when the electronic device 100 stores a higher certificate of authentication to verify the certificate of authentication of the target device 10, the electronic device 100 may perform verification on the certificate of authentication of the target device 10 by using the higher certificate of authentication.

The service provider server 220 that received a user identification request from the digital key service manager server 210 verifies the user in operation 527. In this state, the user verification may include an operation of determining whether the user information previously registered in the service provider server 220 matches the received user information. Furthermore, the verification operation may include registered user ID verification, registered user password verification, target device identification number verification, user name verification, OTP verification, PIN number verification, voice command verification, biometric information verification, and GPS information based location verification.

In operation 529, the service provider server 220 transmits a user verification result to the digital key service manager server 210. In this state, the verification result may include information about whether verification was successful. Furthermore, the service provider server 220 may transmit additional information or software needed for providing a digital key service through a previous discussion with a manufacturer of the electronic device 100. The transmitted software may be, for example, specially encrypted software.

In operation 525, when the user identification request includes the target device 10 identification request, the service provider server 220, in operation 527, verify the target device 10, and in operation 529, may transmit a verification result of the target device 10 with the user verification result to the digital key service manager server 210.

In this state, although the target device 10 (삭제?) identification is described to be performed with the user identification, the disclosure is not limited thereto, and the target device 10 identification may be performed as a separate process. For example, the digital key service manager server 210 may transmit, aside from user identification request, the target device 10 identification request to the service provider server 220.

In operation 531, when the user verification result indicates a success, the digital key service manager server 210 transmits a service activation request to the electronic device 100. In detail, the digital key service manager server 210 may transmit a service activation request to the digital key service SE application 131_2. In this state, the service activation request may include an access token to be used to identify a service access right with respect to the service request of the target device 10. Furthermore, optionally, the service activation request may include attributes information for access token management. In this state, the access token may be in the form of a random value generated by the digital key service manager server 210 or a certificate of authentication signed with a private key of the digital key service manager server 210. The attributes information for access token management may include information indicating whether the access token is disposable and information about valid time of the access token.

In operation 533, the electronic device 100 stores and reflects the received access token. In this state, the reflection of the access token may include an operation of changing settings of an SE application, on the basis of attributes information of the access token. Next, in operation 535, the electronic device 100, in detail, the digital key service SE application 131_2, may request the SE OS/framework 131_4 to change the SE application state to a "service activation" state.

When the access token is successfully reflected in the operation 533, and the application state is successfully changed in the operation 535, in operation 537, the digital key service SE application 131_2 transmits a service activation response to the digital key service manager server 210.

Next, in operation 539, the digital key service manager server 210 encrypts the access token by using the public key of the target device 10. In this state, the public key may be obtained from the certificate of authentication of the target device 10. Next, in operation 541, the digital key service manager server 210, in response to the service access right identification request, transmits a service access right identification response to the registration SE application 131_1. In this state, the service access right identification response may include the encrypted access token.

In operation 543, the registration SE application 131_1, in response to the service access right request, transmits a service access right request response to the target device 10. The service access right request response may include the encrypted access token.

Next, in operation 545, the target device 10 calculates the encrypted access token. In detail, the encrypted access token is decrypted by using the private key of the target device 10 to detect the access token.

In operation 547, the target device 10 generates a digital key configuration including a condition to be used to generate a digital key, and generates a hashed token by hashing the digital key configuration and detected access token. In this state, the digital key configuration may include, for example, information about an algorithm to be used to generate a digital key, the target device 10 identification information, a public key for the digital key generated by the target device 10, or digital key attributes information. The digital key attributes information may include an effective time and radius of use of the digital key. When the target device 10 is a car, the digital key attributes information may include information about an autonomous driving distance or car driving available area, for example, Geo-fencing, restriction information indicating a specific area where driving is possible, car attributes such as a maximum speed, and car use rights such as door opening, trunk opening, or engine starting.

Next, in operation 549, the target device 10 transmits a digital key generation request including a digital key configuration and a hashed token to the electronic device 100, in detail, the registration SE application 131_1.

In operation 551, the electronic device 100, in detail, the registration SE application 131_1, transmits the received digital key generation request first to the SE OS/framework 131_4 in order to transmit the received digital key generation request to the digital key service SE application 131_2. Next, in operation 553, the SE OS/framework 131_4 checks whether the digital key service SE application 131_2 is in a state in which provision of a digital key generation service is possible. In this state, the state in which provision of a service is possible may be indicated as various states such as "Service Activated" or "Service Applicable".

In operation 555, when the digital key service SE application 131_2 is checked to be a state in which the provision of a digital key generation service is possible, according to a result of the operation 551, the SE OS/framework 131_4 transmits the received digital key generation request to the digital key service SE application 131_2.

In operation 557, the digital key service SE application 131_2 detects the digital key configuration and the hashed token from the received digital key generation request. Next, the digital key configuration and a result value obtained by hashing the stored access token received from the digital key service manager server 210 are compared with the received hashed token for verification.

When the verification of the hashed token is successful, in operation 559, the digital key service SE application 131_2 generates a digital key. In this state, the generation of a digital key may include a digital key generation operation based on the digital key configuration. The generated digital key is stored through the above process in the key storage SE application 131_3 that is an area divided for each target device 10.

In operation 561, the digital key service SE application 131_2 transmits a digital key generation issue request response including a digital key generation service performance result to the SE OS/framework 131_4. The digital key generation service performance result may include a generated digital key, digital key attributes information, and the signature of the digital key service SE application 131_2.

Next, in operation 563, the SE OS/framework 131_4 transmits a received digital key issue request response to the registration SE application 131_1. In operation 565, the registration SE application 131_1 transmits a received digital key issue request response to the target device 10.

In operation 567, the digital key service SE application 131_2 requests the SE OS/framework 131_4 to change the state of an application. In detail, it is requested to change the state of an application to a state in which provision of a service is not possible. In this state, the state in which provision of a service is not possible indicates that provision of a digital key generation service is not possible, so as to be indicated as various states such as "Service Deactivated" or "Service non-Applicable".

The embodiments of the disclosure can be written as computer programs and can be implemented in general-use digital computers that execute the programs using a computer-readable recording medium. Furthermore, the structure of the data used in the above-described embodiments may be recorded in a computer-readable medium through various means. Furthermore, the embodiments of the disclosure may be embodied in the form of a recording medium including computer executable instructions, such as a program module executed by a computer. For example, methods that are implemented by software modules or algorithms are codes or program instructions that are computer-readable and executable may be stored in a computer-readable recording medium.

A computer-readable storage medium may be a useable medium that is accessible by a computer and may include all of volatile and non-volatile media and separable and inseparable media. Examples of the computer-readable recording medium include storage media such as magnetic storage media, e.g., ROM, floppy disks, hard disks, etc., optical recording media, e.g., CD-ROMs or DVDs, but the disclosure is not limited thereto. Furthermore, the computer-readable medium may include all of computer storage media and communication media.

Furthermore, the computer-readable recording media may also be distributed over network coupled computer systems so that the computer-readable code is stored and executed in a distributed fashion.

While the disclosure has been particularly shown and described with reference to preferred embodiments using specific terminologies, the embodiments and terminologies should be considered in descriptive sense only and not for purposes of limitation. Therefore, it will be understood by those of ordinary skill in the art that various changes in form and details may be made therein without departing from the spirit and scope of the disclosure as defined by the following claims.

The invention claimed is:

1. An electronic device comprising:
a communication unit;
a secure element; and
a processor configured to generate commands for the secure element to:
perform device authentication on a target device via short-range communication with the target device,
obtain user information related to the target device,
receive, from the target device, a service access right request,
transmit, to a service manager server, a service access right confirm request for the target device including the user information,
receive, from the service manager server, a service activation request including an access token,
perform a service activation procedure based on the service activation request, the service activation procedure including storing the access token for a digital key provision of the target device, determining a status indicating whether a digital key generation service is activated based on the access token, and transmitting, to the service manager server, a service activation response,
transmit, to the target device, a service access right response including an encrypted access token encrypted using a public key of the target device by the service manager server,
receive, from the target device, a digital key generation request, and
generate a command for a digital key generation of the target device based on the digital key generation request in case that the status indicates that the digital key generation service is activated.

2. The electronic device of claim 1, wherein the processor is further configured to generate the commands for the secure element to receive the user information from the target device.

3. The electronic device of claim 1, further comprising an input unit,
wherein the processor is further configured to generate the commands for the secure element to receive the user information through the input unit.

4. The electronic device of claim 3, wherein the processor is further configured to generate the commands for the secure element to perform user verification with the target device based on the user information.

5. The electronic device of claim 1, wherein the processor is further configured to generate the commands for the secure element to:
perform a mutual device authentication with the target device, and
exchange authentication certificate information with the target device.

6. The electronic device of claim 1, wherein a service access right identification request further includes at least one of the information about identification of the target device, information about a certificate of authentication of the target device, or information about identification of a secure element (SE) of the electronic device is transmitted to the service manager server.

7. The electronic device of claim 6, wherein the processor is further configured to generate the commands for the secure element to:
when the electronic device is not in a network connected state, store the information about the identification of the target device and the information about the certificate of authentication of the target device, and
after the electronic device is reconnected to the network, transmit, to the service manager server, the stored information.

8. The electronic device of claim 1, wherein the access token includes at least one of a random value generated by the service manager server or authentication certificate information signed with a private key of the service manager server.

9. The electronic device of claim 1, wherein the processor is further configured to generate the commands for the secure element to:
receive, from the target device, a hashed token including at least one of decryption information of the encrypted access token or digital key configuration information,
verify the hashed token based on the access token, and
generate the digital key based on the verification result.

10. A method of performing digital key provisioning of an electronic device, the method comprising generating commands for a secure element to:
perform device authentication on a target device via short-range communication with the target device;
obtain user information related to the target device;
receive, from the target device, a service access right request including an access token;
transmit, to a service manager server, a service access right confirm request for the target device including the user information;
receive, from the service manager server, a service activation request;
perform a service activation procedure based on the service activation request, the service activation procedure including storing the access token for a digital key provision of the target device, determining a status indicating whether a digital key generation service is activated based on the access token, and transmitting, to the service manager server, a service activation response;
transmit, to the target device, a service access right response including an encrypted access token encrypted using a public key of the target device by the service manager server;
receive, from the target device, a digital key generation request; and
generate a command for a digital key generation of the target device based on the digital key generation request in case that the status indicates that the digital key generation service is activated.

11. The method of claim 10, wherein the generating of the commands for the secure element to obtain the user information comprises generating the commands for the secure element to receive the user information from the target device.

12. The method of claim 10, wherein the generating of the commands for the secure element to obtain the user information comprises generating the commands for the secure element to receive the user information through an input unit.

13. The method of claim 12, further comprising, generating the commands for the secure element to perform user verification with the target device based on the user information.

14. The method of claim 10, wherein the generating of the commands for the secure element to perform the device authentication comprises generating the commands for the secure element to:
perform a mutual device authentication with the target device, and
exchange authentication certificate information with the target device.

15. The method of claim 10, wherein a service access right identification request further includes at least one of the information about identification of the target device, information about a certificate of authentication of the target device, or information about identification of a secure element (SE) of the electronic device is transmitted to the service manager server.

16. The method of claim 15, further comprising, generating the commands for the secure element to:
when the electronic device is not in a network connected state, store the information about the identification of the target device and the information about the certificate of authentication of the target device, and
after the electronic device is reconnected to the network, transmit, to the service manager server, the stored information.

17. The method of claim 10, wherein the access token includes at least one of a random value generated by the service manager server or authentication certificate information signed with a private key of the service manager server.

* * * * *